(12) United States Patent
Wang et al.

(10) Patent No.: US 11,743,559 B2
(45) Date of Patent: *Aug. 29, 2023

(54) METHODS AND SYSTEMS FOR DERIVED IMMERSIVE TRACKS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,112

(22) Filed: Jan. 4, 2022

(65) Prior Publication Data
US 2022/0217452 A1 Jul. 7, 2022

Related U.S. Application Data

(60) Provisional application No. 63/133,808, filed on Jan. 5, 2021.

(51) Int. Cl.
*H04N 21/85* (2011.01)
*H04N 21/84* (2011.01)
*H04N 21/81* (2011.01)

(52) U.S. Cl.
CPC .......... *H04N 21/85* (2013.01); *H04N 21/816* (2013.01); *H04N 21/8146* (2013.01); *H04N 21/84* (2013.01)

(58) Field of Classification Search
CPC .. H04N 21/85; H04N 21/8146; H04N 21/816; H04N 21/84

(Continued)

(56) References Cited

U.S. PATENT DOCUMENTS 11,183,220 B2 * 11/2021 Wang ............ H04N 21/234327
11,245,926 B2 * 2/2022 Wang ................... H04N 21/845
(Continued)

FOREIGN PATENT DOCUMENTS

TW 202042551 A 11/2020

OTHER PUBLICATIONS

[No Author Listed], DAM 1 Support for new media types (haptics, volumetric visual) and other improvements. International Organisation for Standardisation, ISO/IEC JTC1/SC29/WG03 N0047. Oct. 2020. 9 pages.

(Continued)

*Primary Examiner* — Dominic D Saltarelli
(74) *Attorney, Agent, or Firm* — Wolf, Greenfield & Sacks, P.C.

(57) ABSTRACT

The techniques described herein relate to methods, apparatus, and computer readable media configured to access media data for a first three-dimensional (3D) immersive media experience including media tracks each including an associated series of samples of media data for a different component of the first 3D immersive media experience and derived immersive tracks, each comprising a set of derivation operations to perform to generate an associated series of samples of media data for a different component of a second 3D immersive media experience and perform, for each of the one or more derived immersive tracks, a derivation operation of the set of derivation operations by processing associated samples of the one or more media tracks as specified by the derivation operation to generate the associated series of samples of media data of the second 3D immersive media experience.

20 Claims, 20 Drawing Sheets

(58) Field of Classification Search
USPC .......................................................... 725/32
See application file for complete search history.

(56) References Cited

U.S. PATENT DOCUMENTS

2020/0388077 A1* 12/2020 Ninan .................. H04N 13/156
2020/0396471 A1   12/2020 Wang et al.

OTHER PUBLICATIONS

[No Author Listed], Information technology—MPEG systems technologies—Part 16: Derived visual tracks in the ISO base media file format. ISO/IEC 23001-16. 2020. 24 pages.
Hamza et al., Potential Improvement for ISO/IEC 23090-10 Carriage of Visual Volumetric Video-based Coding Data. International Organisation for Standardisation, ISO/IEC JTC1/SC29/WG03 N0022. Oct. 2020. 73 pages.
Stockhammer, Procedures for standard development, test scenarios and reference software for ISO/IEC 23090-14 (MPEG-I Scene Description). International Organisation for Standardisation, ISO/IEC JTC1/SC29/WG03 N00028. Oct. 2020. 25 pages.

* cited by examiner

| Operation | Inputs | Parameters |
|---|---|---|
| Rotate 840 | 1 | 1. X-Y Angle (0º, 90º, 180º, 270º)<br>2. X-Z Angle (0º, 90º, 180º, 270º)<br>3. Y-Z Angle (0º, 90º, 180º, 270º) |
| Mirror 850 | 1 | 1. Horizontal, Vertical or Stacked mirroring |
| Scaling 860 | 1 | 1. Target width numerator<br>2. Target width denominator<br>3. Target height numerator<br>4. Target height denominator<br>5. Target depth numerator<br>6. Target depth denominator |
| Region-of-interest 870 | 2 (immersive visual track, ROI metadata) | (none) |
| Grid composition 880 | N | 1. Output width<br>2. Output height<br>3. Output depth<br>4. Rows<br>5. Columns<br>6. Layers |
| Overlay composition 890 | 2 (input, backdrop) | 1. horizontal_offset<br>2. vertical_offset<br>3. depth_offset |

```
aligned(8) class SRGBFill                              1001
extends VisualDerivationBase ('cfil', flags) {
    unsigned int(16)   red_fill_value    = 0;           // parameter 1
    unsigned int(16)   green_fill_value  = 0;           // parameter 2
    unsigned int(16)   blue_fill_value   = 0;           // parameter 3
    unsigned int(16)   opacity_value     = 65535;       // parameter 4
    unsigned int(32)   output_width      = sample entry width;   // parameter 5
    unsigned int(32)   output_height     = sample entry height;  // parameter 6
    unsigned int(32)   output_depth      = sample entry depth;   // parameter 7
}
```

FIG. 10

```
aligned(8) class SampleCrop                                    ─1200
extends VisualDerivationBase ('crop', flags) {                 ─1201
    unsigned int(32) cleanApertureWidthN = width of the visual input;   // parameter 1   ─1202
    unsigned int(32) cleanApertureWidthD = 1;  // parameter 2           ─1203
    unsigned int(32) cleanApertureHeightN = height of the visual input; // parameter 3   ─1204
    unsigned int(32) cleanApertureHeightD = 1; // parameter 4           ─1205
    unsigned int(32) cleanApertureDepthN = depth of the visual input;   // parameter 5   ─1206
    unsigned int(32) cleanApertureDepthD = 1;  // parameter 6
    unsigned int(32) horizOffN = 0;            // parameter 7
    unsigned int(32) horizOffD = 1;            // parameter 8
                          1208  1207
    unsigned int(32) vertOffN = 0;             // parameter 9
    unsigned int(32) vertOffD = 1              // parameter 10
                          1210  1209
    unsigned int(32) depOffN = 0;              // parameter 11
    unsigned int(32) depOffD = 1               // parameter 12
                          1212  1211
}
```

FIG. 12

```
aligned(8) class SampleRotation
extends VisualDerivationBase ('srot', flags) {    1301
    unsigned int (2) reserved = 0;    // not a parameter
    unsigned int (2) angleXY = 0;     // parameter 1
    unsigned int (2) angleXZ = 0;     // parameter 2
    unsigned int (2) angleYZ = 0;     // parameter 3
}
```
1300    1302    1303

FIG. 13

```
aligned(8) class SampleScaling                                        1500
extends VisualDerivationBase ('sscl', flags) {           1501
    unsigned int (16) target_width_numerator      1502 1503 = 1;  // parameter 1
    unsigned int (16) target_width_denominator              = 1;  // parameter 2
    unsigned int (16) target_height_numerator               = 1;  // parameter 3
    unsigned int (16) target_height_denominator             = 1;  // parameter 4
    unsigned int (16) target_depth_numerator    1506 1505 1504 = 1;  // parameter 5
    unsigned int (16) target_depth_denominator              = 1;  // parameter 6
}
```

FIG. 15

```
aligned(8) class ROISelection
extends VisualDerivationBase ('3dcc', flags) {
}
```
1600

```
aligned(8) class GridComposition                                          1701
extends VisualDerivationBase ('gdcp', flags) {
    unsigned int(8)   rows_minus_one    = 0;  1702                // parameter 1
    unsigned int(8)   columns_minus_one = 0;  1703                // parameter 2
    unsigned int(8)   layers_minus_one  = 0;                      // parameter 3
    unsigned int(32)  output_width   = sample entry width;   1704 // parameter 4
    unsigned int(32)  output_height  = sample entry height;  1705 // parameter 5
    unsigned int(32)  output_depth   = sample entry depth;   1706 // parameter 6
}
```

METHODS AND SYSTEMS FOR DERIVED IMMERSIVE TRACKS

RELATED APPLICATIONS

This Application claims priority under 35 U.S.C. § 119(e) to U.S. Provisional Application No. 63/133,808, filed Jan. 5, 2021, and entitled "METHOD AND SYSTEM FOR DERIVED IMMERSIVE TRACKS IN ISOBMFF," which is hereby incorporated by reference herein in its entirety.

TECHNICAL FIELD

The techniques described herein relate generally to implementing scene descriptions using derived visual tracks, including performing derivation operations on visual inputs using derived immersive tracks (e.g., to obtain video data for immersive media).

BACKGROUND OF INVENTION

Various types of 3D content, immersive content, and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

SUMMARY OF INVENTION

In accordance with the disclosed subject matter, apparatus, systems, and methods are provided for performing derivation operations on visual inputs using derived immersive tracks. Derivation operations specified by derived immersive tracks can, for example, be used to generate media data for an immersive 3D experience.

Some embodiments relate to a method for obtaining video data for immersive media. The method includes accessing media data for a first three-dimensional (3D) immersive media experience, comprising: one or more media tracks, each media track comprising an associated series of samples of media data for a different component of the first 3D immersive media experience; and one or more derived immersive tracks, each comprising a set of derivation operations to perform to generate an associated series of samples of media data for a different component of a second 3D immersive media experience. The method further includes performing, for each of the one or more derived immersive tracks, a derivation operation of the set of derivation operations by processing associated samples of the one or more media tracks as specified by the derivation operation to generate the associated series of samples of media data of the second 3D immersive media experience. In some embodiments, the derivation operation is an identity operation for reproducing associated samples of the one or more media tracks.

In some embodiments, the derivation operation comprises a filling operation for generating the series of samples of media data of the second 3D immersive media experience by filling a single color of a size specified by a pixel width, pixel height and pixel depth.

In some embodiments, the derivation operation comprises an operation for blending samples such that one or more first samples of a first media track of the one or more media tracks fades to one or more second samples of a second media track of the one or more media tracks.

In some embodiments, the derivation operation comprises an operation for cropping the associated samples of the one or more media tracks.

In some embodiments, the derivation operation comprises an operation for rotating the associated samples of the one or more media tracks.

In some embodiments, the derivation operation comprises an operation for mirroring the associated samples of the one or more media tracks.

In some embodiments, the derivation operation comprises an operation for scaling the associated samples of the one or more media tracks to a specified size.

In some embodiments, the one or more media tracks includes a first input track comprising a first series of samples of media data and a second input track comprising metadata specifying 3D coordinate data, and the derivation operation comprises an operation for processing one or more samples of the first series of samples of the first input track based on the specified 3D coordinate data.

In some embodiments, generating the series of one or more derived samples of the second 3D immersive media experience comprises generating a first output track comprising a first series of one or more first derived samples of the second 3D immersive media experience and generating a second output track comprising a second series of one or more second derived samples of the second 3D immersive media experience.

In some embodiments, the number of the one or more derived immersive tracks is equal to the number of the one or more one or more media tracks, and wherein generating the series of samples of the second 3D immersive media experience comprises performing, for each of the one or more derived immersive tracks, a derivation operation of the set of derivation operations, and generating an output track comprising the generated associated series of samples of media data of the second 3D immersive media experience.

In some embodiments, the one or more media tracks comprises a plurality of media tracks and the derivation operation comprises an operation for generating a composition of media samples of each of the plurality of media tracks.

In some embodiments, the one or more media tracks comprises a plurality of media tracks and the derivation operation comprises an operation for overlaying one or more first samples of a first media track of the plurality of media tracks over a one or more second samples of a second media track of the plurality of media tracks.

Some embodiments relate to an apparatus configured to decode video data. The apparatus includes a processor in communication with memory, the processor being configured to execute instructions stored in the memory that cause the processor to perform accessing media data for a first three-dimensional (3D) immersive media experience, comprising: one or more media tracks, each media track comprising an associated series of samples of media data for a different component of the first 3D immersive media experience; and one or more derived immersive tracks, each comprising a set of derivation operations to perform to generate an associated series of samples of media data for a different component of a second 3D immersive media experience, and performing, for each of the one or more derived immersive tracks, a derivation operation of the set of derivation operations by processing associated samples of the one or more media tracks as specified by the derivation operation to generate the associated series of samples of media data of the second 3D immersive media experience.

In some examples, generating the series of samples of media data of the second 3D immersive media experience comprises generating a first output track comprising a first series of one or more first derived samples of the second 3D immersive media experience, and generating a second output track comprising a second series of one or more second derived samples of the second 3D immersive media experience.

In some examples, the number of the one or more derived immersive tracks is equal to the number of the one or more one or more media tracks, and wherein generating the series of samples of the second 3D immersive media experience comprises performing, for each of the one or more derived immersive tracks, a derivation operation of the set of derivation operations, and generating an output track comprising the generated associated series of samples of media data of the second 3D immersive media experience.

Some embodiments relate to at least one non-transitory computer-readable storage medium storing processor executable instructions that, when executed by at least one processor, cause the processor to perform a method comprising accessing media data for a first three-dimensional (3D) immersive media experience, comprising: one or more media tracks, each media track comprising an associated series of samples of media data for a different component of the first 3D immersive media experience; and one or more derived immersive tracks, each comprising a set of derivation operations to perform to generate an associated series of samples of media data for a different component of a second 3D immersive media experience, and performing, for each of the one or more derived immersive tracks, a derivation operation of the set of derivation operations by processing associated samples of the one or more media tracks as specified by the derivation operation to generate the associated series of samples of media data of the second 3D immersive media experience.

In some examples, generating the series of samples of the second 3D immersive media experience comprises generating a first output track comprising a first series of one or more first derived samples of the second 3D immersive media experience, and generating a second output track comprising a second series of one or more second derived samples of the second 3D immersive media experience.

In some examples, the number of the one or more derived immersive tracks is equal to the number of the one or more one or more media tracks, and wherein generating the series of samples of the second 3D immersive media experience comprises performing, for each of the one or more derived immersive tracks, a derivation operation of the set of derivation operations; and generating an output track comprising the generated associated series of samples of media data of the second 3D immersive media experience.

In some examples, the derivation operation is an identity operation for reproducing associated samples of the one or more media tracks.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 8B shows another exemplary table describing derivation transformations for derived immersive tracks, according to some embodiments.

FIG. 10 shows an exemplary syntax that can be used to reproduce an immersive visual input, according to some embodiments.

FIG. 12 shows an exemplary syntax that can be used to specify a cropping transformation of the immersive visual input, according to some embodiments.

FIG. 13 shows an exemplary syntax that can be used to rotate an immersive visual input, according to some embodiments.

FIG. 15 shows an exemplary syntax that can be used to scale an input to a specified size, according to some embodiments.

FIG. 17 shows an exemplary syntax that provides a composition of immersive visual inputs in a given 3D grid order, according to some embodiments.

DETAILED DESCRIPTION OF INVENTION

Figure 1:
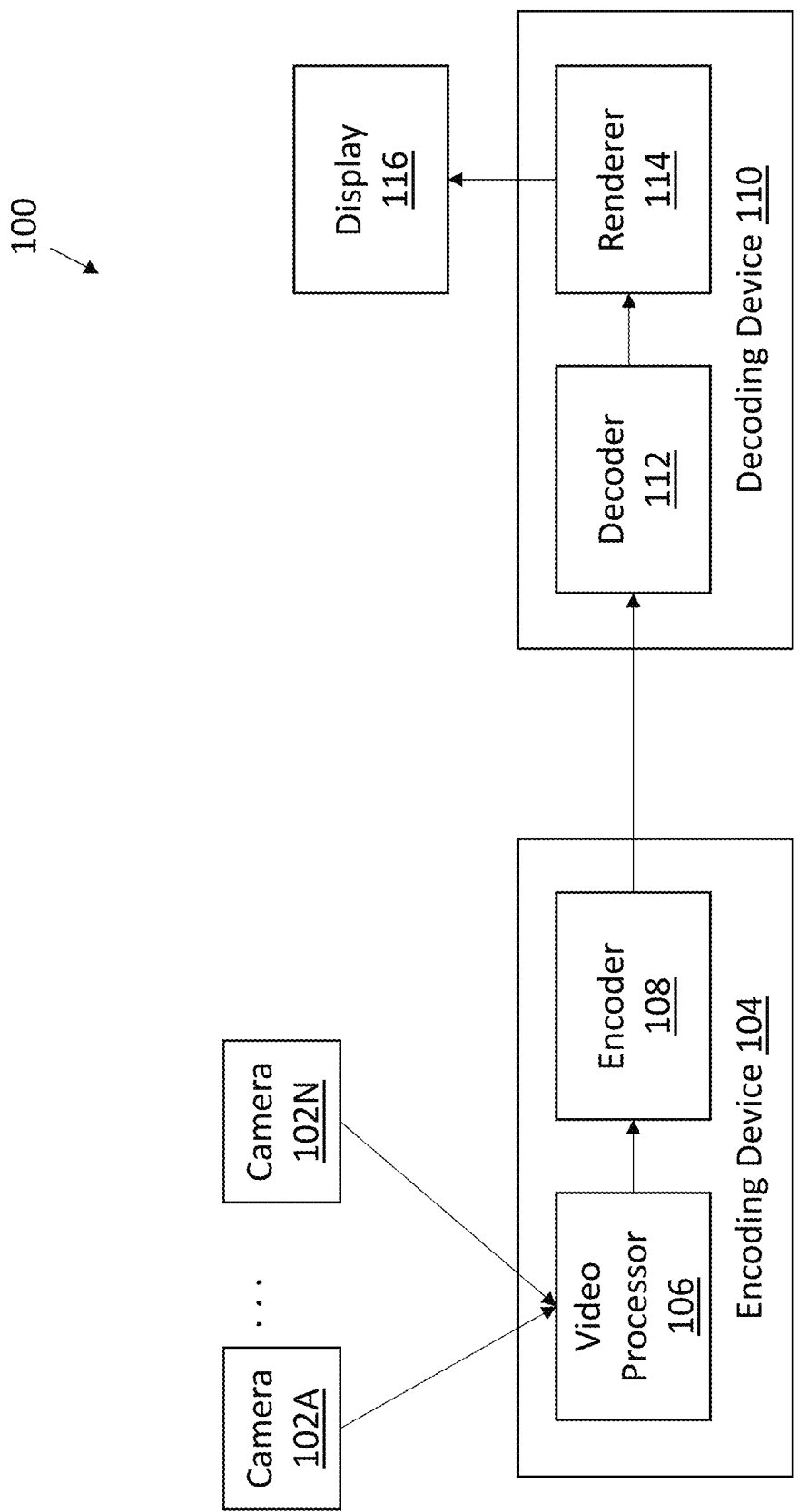
FIG. 1 shows an exemplary video coding configuration, according to some embodiments.

Derived visual tracks can be used to provide a timed sequence of visual transformation operations that are applied to input still images and/or samples of timed sequences of images. Accordingly, conventional derived visual track approaches are limited and only provide for using derived tracks on input still images, two-dimensional images, or samples of times sequences of two-dimensional pictures or images. The result of the derivation operation(s) of conventional derived visual tracks is a two-dimensional video or picture set. As a result, derived visual tracks cannot be used to carry or process three-dimensional immersive content, such as volumetric visual tracks. Examples of volumetric tracks are, for example, described in N00022, "Potential improvement for ISO/IEC 23090-10 Carriage of Visual Volumetric Video-based Coding Data," ISO/IEC JTC 1/SC 29/WG 3, October 2020 and N00047, "14496-12:2020 DAM 1 Support for new media types (haptics, volumetric visual) and other improvements," ISO/IEC JTC 1/SC 29/WG 3, October 2020, which are both hereby incorporated by reference herein in their entirety. As another example, MPEG includes a number of different standards that are used to specify immersive media content, including MPEG-I, Part 10, "Carriage of Visual Volumetric Video-based Coding Data" (e.g., including carriage of MPEG-I, Part 5, "Video-based Point Cloud Compression and Visual Volumetric Video-based Coding" and MPEG-I, Part 12, "Immersive Video"), MPEG-I 14, "Scene Descriptions for Immersive Media" (e.g., including use cases of overlaying immersive and conventional media content), and MPEG-18, "Carriage of Geometry-based Point Cloud Compression Data." Of note, none of such immersive media content approaches are traditional 2D picture or video content.

As an illustrative example, conventional derived visual tracks are limited to using 2D compression techniques. Since point cloud data or other immersive media content is in the 3D space (e.g., projected onto the six faces of a cube), immersive media content often includes several different tracks. For example, immersive media content can include an atlas track and one or more video component tracks, such as geometry tracks, attribute tracks, and occupancy tracks, which are all required for the immersive media content. Since derived visual tracks are limited to 2D compression that is only applicable to traditional 2D picture or 2D video tracks, conventional derived visual track approaches cannot be used on such immersive media content.

The inventors have appreciated that it is desirable to provide technology to implement various immersive media scenes and experiences using a derived track approach. Accordingly, some aspects of the techniques described herein provide derived immersive track approaches that can carry immersive media content. In some embodiments, the derived immersive track approaches can take as input immersive media content (e.g., one or more volumetric tracks) and/or output immersive media content (e.g., one or more volumetric tracks). Some embodiments provide a file format-based approach that uses derived immersive tracks to implement three-dimensional immersive media scenes. For example, a derived immersive track may describe a timed sequence of derived samples composed of an ordered list of derivation operations, where each derivation operation may apply a derivation transformation. In some embodiments, derived immersive tracks may include samples that specify derivation transformations that can be used to generate, using input tracks or images, an output immersive track (e.g., volumetric 3D track(s), such as point cloud data tracks). In some embodiments, derived immersive tracks can specify the derivation operations on immersive media content contained in input tracks. Some embodiments provide for a mix of content that includes both immersive media content and traditional 2D images or 2D video content.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
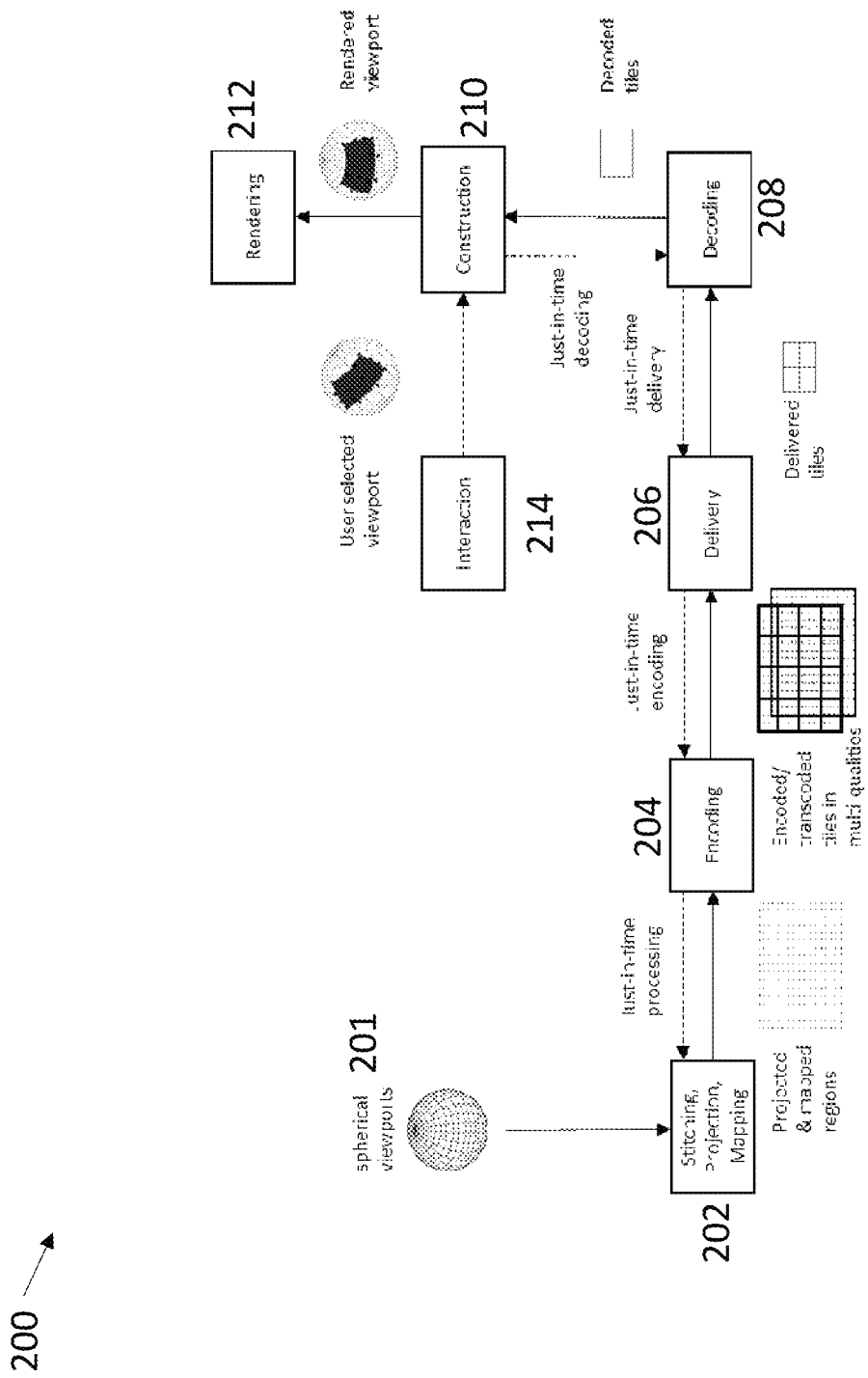
FIG. 2 shows a viewport dependent content flow process for VR content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

A flat file structure for the content could be used, for example, for a video track for a single movie. For VR content, there is more content than is sent and/or displayed by the receiving device. For example, as discussed herein, there can be content for the entire 3D sphere, where the user is only viewing a small portion. In order to encode, store, process, and/or deliver such content more efficiently, the content can be divided into different tracks.

Figure 3:
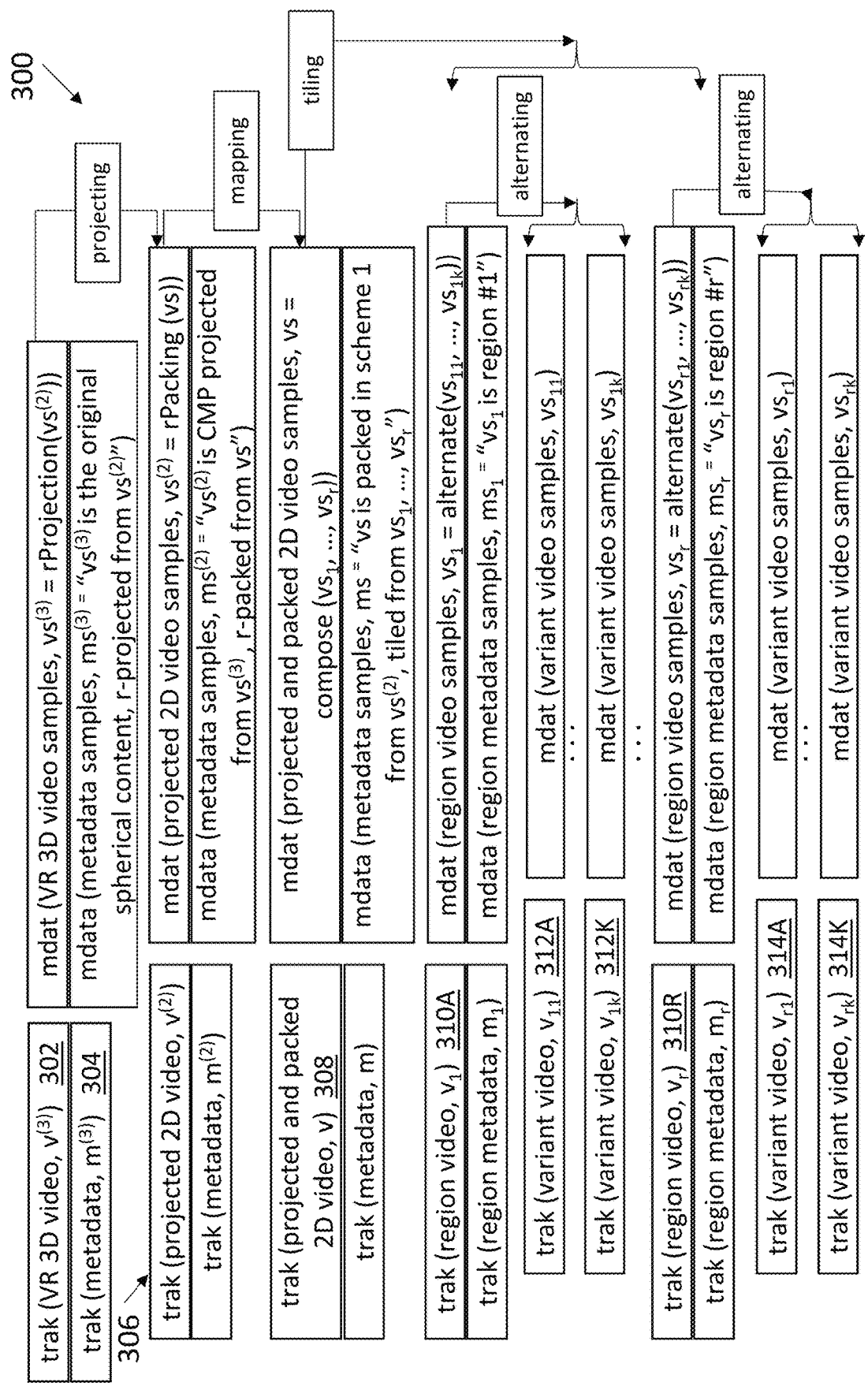
FIG. 3 shows an exemplary track hierarchical structure, according to some embodiments.

FIG. 3 shows an exemplary track hierarchical structure 300, according to some embodiments. The top track 302 is the 3D VR spherical content track, and below the top track 302 is the associated metadata track 304 (each track has associated metadata). The track 306 is the 2D projected track. The track 308 is the 2D big picture track. The region tracks are shown as tracks 310A through 310R, generally referred to as sub-picture tracks 310. Each region track 310 has a set of associated variant tracks. Region track 310A includes variant tracks 312A through 312K. Region track 310R includes variant tracks 314A through 314K. Thus, as shown by the track hierarchy structure 300, a structure can be developed that starts with physical multiple variant region tracks 312, and the track hierarchy can be established for region tracks 310 (sub-picture or tile tracks), projected and packed 2D tracks 308, projected 2D tracks 306, and VR 3D video tracks 302, with appropriate metadata tracks associated them.

In operation, the variant tracks include the actual picture data. The device selects among the alternating variant tracks to pick the one that is representative of the sub-picture region (or sub-picture track) 310. The sub-picture tracks 310 are tiled and composed together into the 2D big picture track 308. Then ultimately the track 308 is reverse-mapped, e.g., to rearrange some of the portions to generate track 306. The track 306 is then reverse-projected back to the 3D track 302, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118$^{th}$ meeting, April 2017, which are hereby incorporated by reference herein in their entirety. In FIG. 3, rProjection, rPacking, compose and alternate represent the track derivation TransformProperty items reverse 'proj', reverse 'pack', 'cmpa' and 'cmpl', respectively, for illustrative purposes and are not intended to be limiting. The metadata shown in the metadata tracks are similarly for illustrative purposes and are not intended to be limiting. For example, metadata boxes from OMAF can be used as described in w17235, "Text of ISO/IEC FDIS 23090-2 Omnidirectional Media Format," 120th MPEG Meeting, October 2017 (Macau, China), which is hereby incorporated by reference herein in its entirety.

The number of tracks shown in FIG. 3 is intended to be illustrative and not limiting. For example, in cases where some intermediate derived tracks are not necessarily needed in the hierarchy as shown in FIG. 3, the related derivation steps can be composed into one (e.g., where the reverse packing and reverse projection are composed together to eliminate the existence of the projected track 306).

A derived visual track can be indicated by its containing sample entry of type 'dtrk'. A derived sample contains an ordered list of the operations to be performed on an ordered list of input images or samples. Each of the operations can be specified or indicated by a Transform Property. A derived visual sample is reconstructed by performing the specified operations in sequence. Examples of transform properties in ISOBMFF that can be used to specify a track derivation, including those in the latest ISOBMFF Technologies Under Consideration (TuC) (see, e.g., N17833, "Technologies under Consideration for ISOBMFF", July 2018, Ljubljana, SK, which is hereby incorporated by reference herein in its entirety), include: the 'idtt' (identity) transform property; the 'clap' (clean aperture) transform property; the 'srot' (rotation) transform property; the 'dslv' (dissolve) transform property; the '2dcc' (ROI crop) transform property; the 'tocp' (Track Overlay Composition) transform property; the 'tgcp' (Track Grid Composition) transform property; the 'tgmc' (Track Grid Composition using Matrix values) transform property; the 'tgsc' (Track Grid Sub-Picture Composition) transform property; the 'tmcp' (Transform Matrix Composition) transform property; the 'tgcp' (Track Grouping Composition) transform property; and the 'tmcp' (Track Grouping Composition using Matrix Values) transform property. All of these track derivations are related to spatial processing, including image manipulation and spatial composition of input tracks.

Derived visual tracks can be used to specify a timed sequence of visual transformation operations that are to be applied to the input track(s) of the derivation operation. The input tracks can include, for example, tracks with still images and/or samples of timed sequences of images. In some embodiments, derived visual tracks can incorporate aspects provided in ISOBMFF, which is specified in w18855, "Text of ISO/IEC 14496-12 $6^{th}$ edition," October 2019, Geneva, CH, which is hereby incorporated by reference herein in its entirety. ISOBMFF can be used to provide, for example, a base media file design and a set of transformation operations. Exemplary transformation operations include, for example, Identity, Dissolve, Crop, Rotate, Mirror, Scaling, Region-of-interest, and Track Grid, as specified in w19428, "Revised text of ISO/IEC CD 23001-16 Derived visual tracks in the ISO base media file format," July 2020, Online, which is hereby incorporated by reference herein in its entirety. Some additional derivation transformation candidates are provided in the TuC w19450, "Technologies under Consideration on ISO/IEC 23001-16," July, 2020, Online, which is hereby incorporated by reference herein in its entirety, including composition and immersive media processing related transformation operations.

Figure 4:
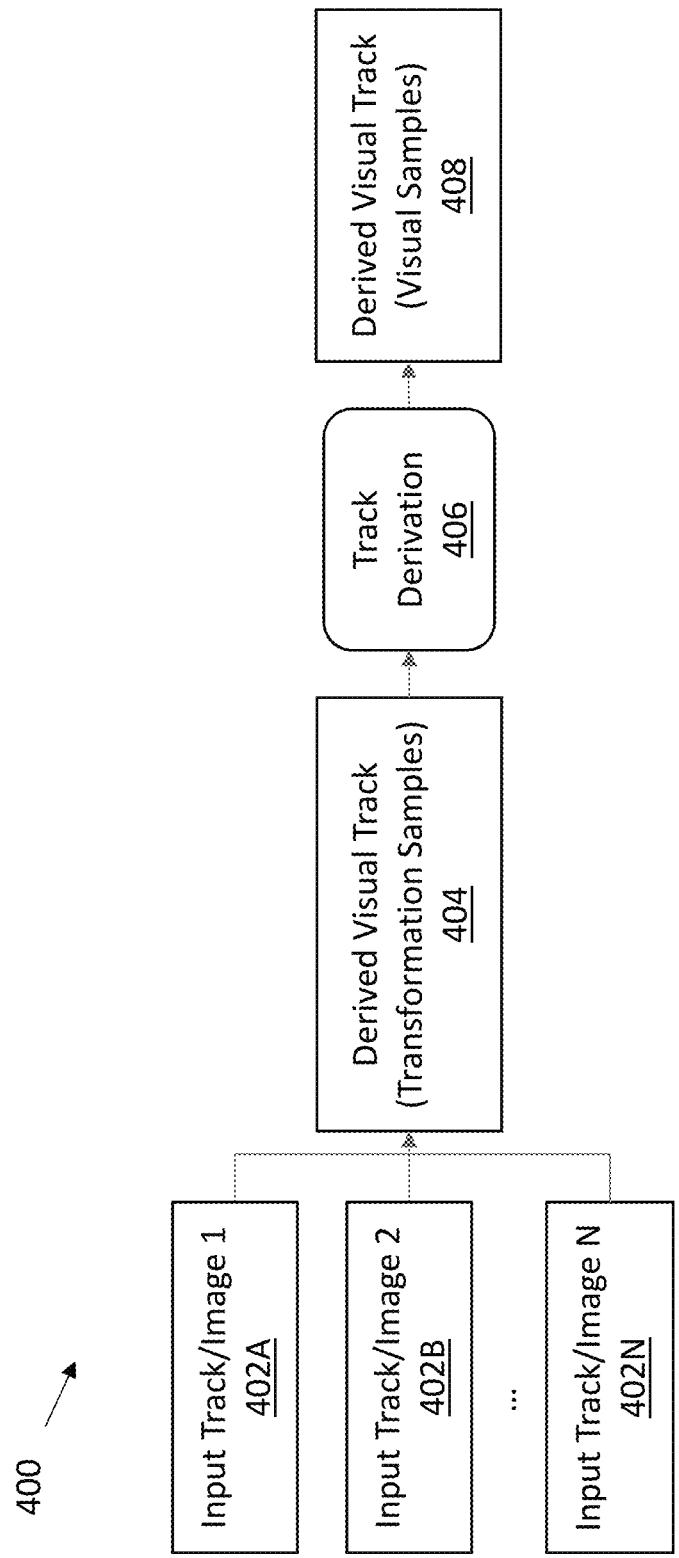
FIG. 4 shows an example of a track derivation operation, according to some examples.
Figure 5:
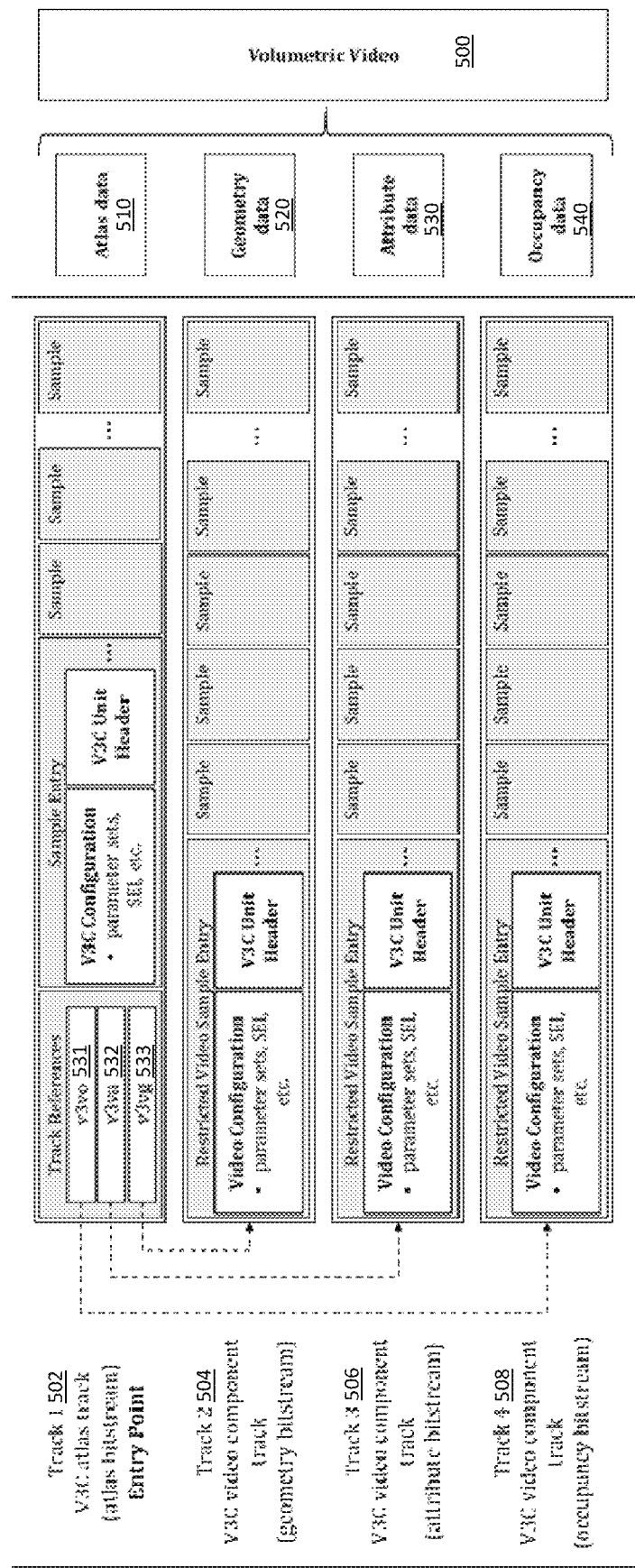
FIG. 5 shows a data structure for an exemplary volumetric video, according to some embodiments.

FIG. 4 shows an example of a track derivation operation 400, according to some examples. A number of input tracks/images one (1) 402A, two (2) 402B through N 402N are input to a derived visual track 404, which carries transformation operations for the transformation samples. The track derivation operation 406 applies the transformation operations to the transformation samples of the derived visual track 404 to generate a derived visual track 408 that includes visual samples. FIG. 5 shows an exemplary data structure for volumetric video 500, according to some embodiments. Volumetric data 500 may be carried by component tracks such as atlas track 1 502 that carries atlas data 510, track 2 504 that carries geometry data 520, track 3 506 that carries attribute data 530, and track 4 508 that carries occupancy data 540. Track 1 502 may include track includes references 531-533 to the geometry track 2 504 with the geometry data of the immersive media, attribute track 3 506 with the attribute data of the immersive media, and occupancy track 4 508 with the occupancy map data of the immersive media. In some embodiments, receiving or accessing the immersive media data therefore includes accessing the geometry data, the attribute data, and the occupancy map data accordingly as separate bitstreams (each of which carries its own associated set of samples).

A scene description (e.g., an MPEG-I Scene Description) may provide a format for providing a description of an immersive media experience. A scene description can, for example, provide a format based on immersive content, such as 3DoF and 6DoF content. The format can be used with one or more technologies, such as Augmented Reality (AR), Virtual Reality (VR), and/or Mixed Reality (MR) technologies. The Scene Description may store 3D data such as, for example, synthetic 3D data (e.g., created by a computer) and/or natural 3D data (e.g., captured from the real world using cameras). The scene description can also include other data, such as 2D data, audio data, etc. In some examples, the scene description may expose interfaces between components of the format and/or enable 3D interactive experiences. For example, in addition to describing scenes, a scene description can include interfaces between components in scenes (e.g., of various 2D and/or 3D content source(s) associated with the scene).

According to some embodiments, the scene description may be input into and used by a presentation engine that uses the scene description to render a scene (e.g., 3D scene) to a viewer. The extensions provided in the specification of the scene description may allow for the creation of immersive experiences using immersive media, such as MPEG media.

Scene descriptions can leverage various structures to describe the scene. According to some embodiments, a scene graph is a type of a scene description, where, for example, a scene is described using a graph structure. A scene graph may be used to describe scenes including different types of video, images, audio, and/or the like and may be implemented by providing extensions to scene description formats in order to support immersive media. Examples of supporting MPEG media are described in "The GL Transmission Format (glTF) 2.0", N19290, "WD on Scene Description for MPEG Media", July 2020, Online, which are hereby incorporated by reference herein in their entirety. In other embodiments other scene descriptions may be used, such as scene descriptions that include relations using object lists.

As an illustrative example, the MPEG-I Scene Descriptions, whether implemented as scene graphs and/or other formats, may be used in different reference usage scenarios as described in N18339, "Requirements on Integration of Scene Description in MPEG-I," March 2019, Geneva, CH, which is hereby incorporated by reference herein in its entirety. These reference usage scenarios provide for high-level concepts that need to be implemented. A first example of a reference usage scenario is one that uses 360 degree image and/or video. For example, it can be desirable to provide for a scene description that describes a scene that includes a 360 degree image. The content for the scene can be obtained from various sources. According to some embodiments, the image can be referenced locally. According to some embodiments, the image may be referenced through a network.

Variations of this first exemplary scenario are possible. For example, the images and/or video can be streamed over the network (e.g., using Dynamic Adaptive Streaming over HTTP (DASH)). In some examples, the geometry of the image or video is based on a spherical geometry, but is not limited as such and may be provided in formats different than a sphere (e.g., as a cube). According to some examples, the video is in stereoscopic format. In some examples, the referenced content is a 360 video formatted as an Omnidirectional Media Format (OMAF) file. In some examples, the video is included in an OMAF file as one or multiple tracks, and the OMAF file may also contain an audio track.

A second example of a reference usage scenario is for 3D audio and 360 degree video. For example, it can be desirable for a scene description to describe a scene that consists of a 360 degree image and 3D audio. In some embodiments, the 360 degree image and 3D audio are both contained in one local file. In some examples, the audio may be stereo audio. In some examples, the audio is 3D audio. In some examples, the audio contains 3D audio and a non-diegetic content.

A third example of a reference usage scenario is for 360 degree video and subtitles. According to some embodiments, it can be desirable for the scene description to describe a scene that consists of a 360 degree image and a subtitle track. The rendering of the subtitle track may be controlled by the scene description.

A fourth example of a reference usage scenario is for combination with local objects. According to some embodiments, it can be desirable for the scene description to combine a scene (e.g., as discussed in one of the previous three exemplary reference usage scenarios) with local objects. For example, additionally or alternatively to the embodiments described herein, a local object may be present with the Scene Description. For example, an image is placed as an overlay to the scene and/or a local audio source may be added to the scene.

A fifth example of a reference usage scenario is a 3D scene with 2D video. According to some embodiments, the scene description can be used to compose the 3D and 2D scene and to display the 2D video on the 3D area. The 2D video can be referenced locally or through the network.

Figure 6:
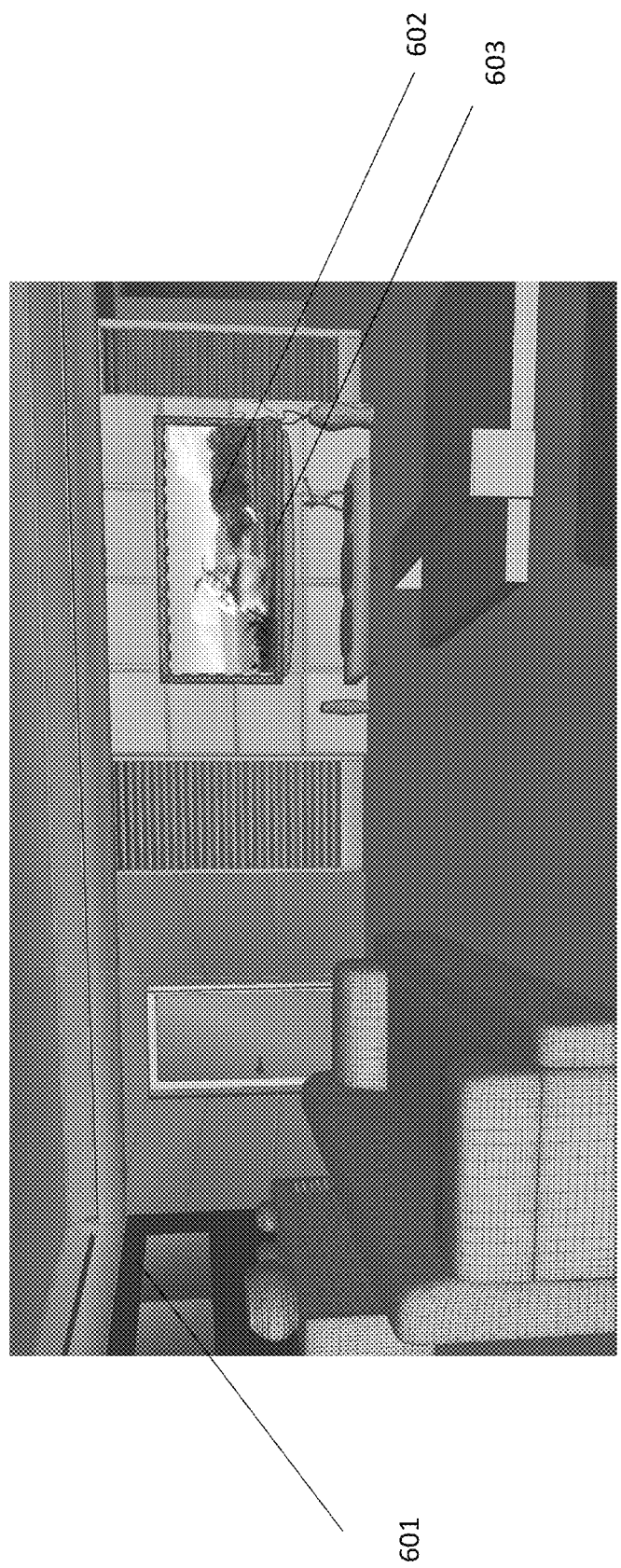
FIG. 6 shows an exemplary 3D scene including a 2D video, according to some embodiments.

FIG. 6 shows an exemplary 3D scene 601 including a 2D video 602, according to some examples. In FIG. 6, the exemplary 3D scene 601 of a living room may include one or more 2D areas, such as screen 603 of 3D flat screen. The 2D video 602 may be displayed on the one or more 2D areas.

Figure 7:
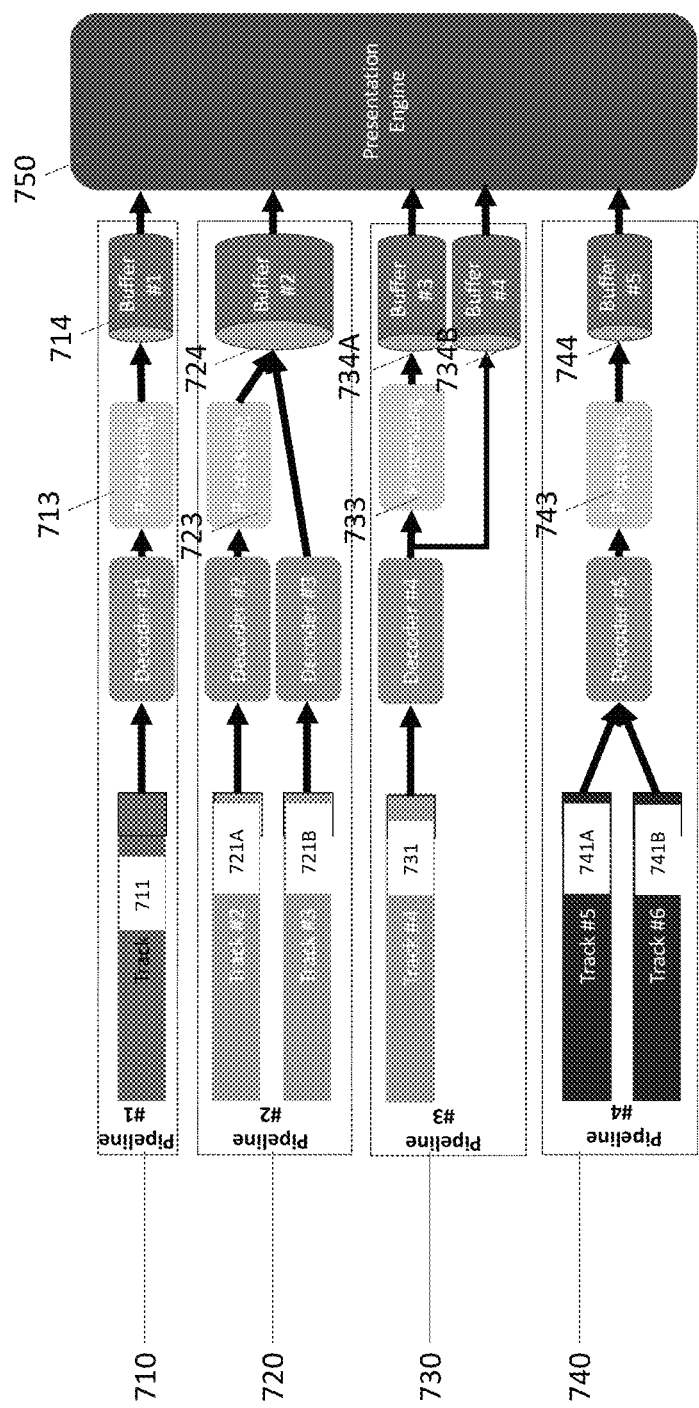
FIG. 7 shows an exemplary process for MPEG-I Scene Description media processing, according to some embodiments.

FIG. 7 shows an exemplary process for MPEG-I Scene Description media processing, according to some examples (e.g., as described in N19290, referenced above). In the example of FIG. 7, each of the pipelines 710, 720, 730, 740, and 750 takes in as input one or more media or metadata tracks and outputs the decoded and processed content to one or more buffers associated with each pipeline. For example, pipeline 710 takes in track 711 and outputs buffer 714, pipeline 720 takes in tracks 721A-B and outputs buffer 724, pipeline 730 takes in track 731 and outputs buffers 734A-B, and pipeline 740 takes in track 741A-B and outputs buffer 744.

Each pipeline can be configured to perform one or more processing steps (e.g., 713, 723, 733 and 743), including, for example, streaming, demultiplexing, decoding, decryption, and/or format conversion to match the expected buffer format. The scene description can include data that describes how to process the content from the buffers (e.g., 714, 724, 734A-B, and 744) feeding into the presentation engine 750. As described herein, the scene description may be input into and/or accessed by the presentation engine 750 to process the content from across the various buffers in order to render a scene (e.g., 3D scene) to a viewer. In some examples, the processing steps may convert formats of the buffered data, may create new static or dynamic buffers (e.g., index buffers based on metadata received from the file itself), and/or the like.

Derived visual tracks can be used to provide a timed sequence of visual transformation operations that are applied to traditional input 2D still images and/or samples of timed sequences of 2D images (e.g., 2D video). As a result, the inventors have appreciated that derived visual tracks cannot be used to carry or process three-dimensional immersive content, such as volumetric visual tracks. In particular, conventional derived visual tracks are limited to using 2D compression techniques. Since point cloud data or other immersive media content is in the 3D space (e.g., projected onto the six faces of a cube), as described herein (e.g., in conjunction with FIG. 5, immersive media content often includes several different tracks, such as an atlas track and one or more video component tracks, such as geometry tracks, attribute tracks, and occupancy tracks, which are all required for the immersive media content. As a result, many scenarios cannot be handled using conventional derived visual tracks. For example, such conventional approaches cannot be used to rendering a 3D space with 2D video as described in conjunction with FIG. 6. As another example, in FIG. 7 one or more pipelines may include immersive media content, and therefore conventional derivation techniques cannot be used for such pipelines.

The inventors have therefore developed derived immersive track approaches that can carry immersive media content. For example, 3D immersive media content can be created and encapsulated within a file format, such as that done with ISOBMFF. In some embodiments, the derived immersive track approaches can take as input immersive media content (e.g., one or more volumetric tracks) and/or output immersive media content (e.g., one or more volumetric tracks). For example, a derived immersive track may include samples that describe a timed sequence of derived samples composed of an ordered list of derivation operations, where each derivation operation may apply a derivation transformation on and/or generate an immersive media track (e.g., volumetric 3D track(s), such as point cloud data tracks). In some embodiments, the derivation transformations can include three-dimensional (3D) and/or immersive derivation transformations. In some embodiments, derived immersive tracks may include samples that specify derivation transformations that can be used. In some embodiments, derived immersive tracks can specify the derivation operations on immersive media content contained in input tracks.

Accordingly, the techniques described herein can provide desired functionality, such as transformation functionality similar to that provided by two-dimensional and/or visual derivation transformations (e.g., as described in N00037, "Text of ISO/IEC DIS 23001-16 Derived visual tracks in the ISO base media file format," ISO/IEC JTC 1/SC 29/WG 3, October 2020, which is hereby incorporated by reference herein in their entirety) that can be used for immersive media content. Accordingly, the techniques described herein can provide for derived immersive tracks that are configured based on aspects of derived visual tracks (e.g., as described in section 4 of N00037). In some examples, derivation transformations of the immersive tracks may be based on one or more derivation transformations for derived visual tracks (e.g., as described in section 8 of N00037), as described further herein.

According to some aspects of the present invention, the techniques provide a file format-based approach that uses derived immersive tracks to implement three-dimensional (3D) immersive media scenes. For example, a derived immersive track may describe a timed sequence of derived samples composed of an ordered list of derivation operations where each derivation operation may apply a derivation transformation. For example, supported transformations may include identity, composition, rotation, scaling and grid composition operations. For example, the derived immersive tracks may take 3D input tracks and perform a series of derivation operations (e.g., such as composition and/or overlay operations) to generate derived tracks that can be used to implement immersive media usage scenarios, such as those described herein.

According to some embodiments, the derived immersive tracks can be used to process both traditional 2D video content as well as immersive media content to render an immersive media scene. As an illustrative example, a derived immersive track can specify the derivation operations on input tracks, which can include immersive media content as well as video content, in order to render an immersive media scene, such as that shown in FIG. 6. For example, a derived immersive track may specify a composition transformation to perform in input tracks (e.g., visual and/or immersive), and the track derivation may be performed to generate a composed immersive track representing an immersive media experience using the associated input tracks (e.g., as specified in a scene description).

Accordingly, the techniques described herein provide for derived immersive media tracks that can operate on different input(s), output(s), and provide new derivation operation(s) for the immersive media context. Therefore, while similar functionality can be provided as that used in derived visual tracks, such functionality is implemented differently as described herein using different exemplary specifications. Thus, the techniques provide technical improvements to conventional derivation approaches by creating a new derived immersive track approach that can be used for immersive media content. It should be appreciated that while examples are provided herein of various types of immersive media content and derived immersive track operations, such examples are provide for illustrative purposes only and are not intended to be limiting.

In some embodiments, a derived immersive track may describe a timed sequence of derived samples composed of an ordered list of derivation operations. Each derivation operation may apply a derivation transformation for the duration of the derived sample on an ordered list of inputs represented in the same presentation. According to some examples, a derived immersive track may be an immersive media track (e.g., a track with the 'volv' handler type in the HandlerBox of the MediaBox, as specified in ISO/IEC 14496-12).

According to some examples, a derived immersive track can be specified and/or identified based on a sample entry type. For example, a derived immersive track can be identified by its containing sample entry(ies) of type 'ditk' DerivedImmersiveSampleEntry, and each sample described by a DerivedImmersiveSampleEntry may be a derived sample. According to some embodiments, a derived visual track may include a TrackReferenceTypeBox with reference_type equal to 'ditk' referring to all its input tracks. Each reference may be either (a.i) the track_ID of a track used by derived samples in the track, or (a.ii) if unified IDs are in use as specified by ISO/IEC 14496-12, a track_group_id, or (b) the item_ID of an image item, in the file-level MetaBox, used by derived samples in the track.

In some embodiments, an ID value in the track references can be resolved in one or more ways. For example, an ID value can be resolved to a track_ID whenever the file contains a track with such ID. A track_ID may be an ID of a derived immersive track or a derived visual track. In some embodiments, an ID value in the track references is resolved to a track_group_id whenever unified IDs are in use and the file contains a track group with such ID. In some embodiments, an ID value in the track references is resolved to an item_ID otherwise.

In some embodiments, the techniques can be used in conjunction with alternate groups. For example, if a referenced track is a member of an alternate group and/or if the reference is to a track group, then the reader (e.g., decoder or encoder) can pick a track from the group as the input to the derived immersive track. Similarly, if a referenced image item is a member of an alternate group, then the reader (e.g., decoder or encoder) can pick an image item from the group as the input to the derived immersive track.

According to some embodiments, a derived sample contains an ordered list of the derivation operations to be performed. Each derivation operation may apply a derivation transformation on an ordered list of input tracks. In some examples, the layer syntax element (e.g., in TrackHeaderBox) has no impact on ordering the input tracks for derived samples.

According to some embodiments, a derivation transformation from derivation operations used by the derived samples in the track may be associated with a code, such as a four-character code. Each of the codes may be listed in a sample entry (e.g., the DerivedImmersiveSampleEntry), and default inputs and parameter values may also be supplied in the sample entry. In some examples, a derived sample in the track may use all or some of the derivation operations listed in the linked sample entry (e.g., DerivedImmersiveSampleEntry), but may not use a derivation operation which is not listed in the sample entry.

According to some embodiments, the derived sample durations can specify or document the time over which the derivation represented by the ordered list of derivation operations is active. Therefore, the number of samples specified in a derived immersive track does not necessarily need to match one to one with the number of input image items or samples of input tracks that are being transformed. For example, a single derivation duration may span multiple samples in the source track(s). In some examples, derivation transformations in derived samples may have an internal time structure (e.g. for a cross-fade) so that the immersive media may change during the sample duration. This is in contrast to, for example, classic video.

In some examples, derived immersive tracks may not use composition-time re-ordering on input tracks. For example, they may additionally or alternatively operate on the composition timeline (e.g., before the application of edit lists) of their input tracks (including on derived immersive tracks when used as visual inputs). However, in some embodiments the input tracks may be constrained such that they do not include edit lists. For such a constraint, any edit lists of the input tracks can be ignored if present.

In some embodiments, when time-alignment adjustment between input tracks is needed, signed composition offsets in input tracks may be used.

According to some embodiments, a derived immersive track may have an edit list. For example, a derived immersive track using the identity transform described herein, and with an edit-list, can provide a visual output that is a temporal re-mapping of the input track.

The inputs for a derivation operation in a derived sample can be either input image items (e.g., from file-level MetaBox) or intervals (e.g., possibly spanning multiple samples) of input video tracks, image sequence tracks, or metadata tracks, the visual output of a preceding derivation operation, and/or an input picture (e.g., a default input fill picture).

According to some embodiments, item properties that are transformative or transformations (e.g., clean aperture, track matrix, etc.) associated with input image items or samples of input tracks may be applied before performing the derivation operation. In some examples, if a derived sample needs to refer to one explicit sample value in a referred track (e.g., other than the time-aligned sample value), an item may be created and referred to that has the same data as the desired sample value.

According to some embodiments, the visual inputs in a derived sample may have consistent pixel aspect ratio and bit depth. For example, the input image items, samples of input tracks or derived samples may have various width and height as well as depth (for 3D cases). In some examples, when differences in width, height and depth result in pixels that never get 'painted' or transformed by a derivation operation, those empty pixels are filled according to the value of a parameter, default_derivation_input, signalled in Derived VisualTrackConfigRecord (black, white or grey pixels). In some examples, when differences in width, height and depth result in pixels that end up outside the visual output size by a derivation operation, those pixels may be cropped. In some examples, default behavior, such as cropping or filling pixels, may be overridden by derivation operation specifications.

In some embodiments, a derived sample may be reconstructed by performing specified derivation operations in sequence. Some derivation operations can be marked as non-essential which indicates that the derivation operation may be skipped by the reader. However, the operations marked as essential may be used in order to obtain a valid derived sample. In some examples, when more than one derivation operation is listed in a derived sample, the derivation operation that is not first in the list may include the output result (e.g., the visual output) of any of the previous derivation operations, only new inputs, or some combination thereof.

According to some embodiments, some source tracks (e.g., source tracks pointed to by the 'ditk' track reference) are not intended for display. When a track is not intended for display, a field indicating whether or not the track will be in the movie (e.g., track_in_movie) may be equal to 0 for that track. The visual output of a derived sample may be the output from the last derivation operation in the sample. In some examples, if there is no derivation operation, an empty derived sample (e.g., sample size of 0) is equivalent to an empty edit, for example, there is no visual output from the derived immersive track at that time.

According to some embodiments, a series (e.g., a chain) of derivation operations may be built on one single derived immersive track. In some embodiments, a series (e.g., a chain) of derivation operations may be built on a hierarchy of multiple derived immersive tracks and derived visual tracks. For example, the output of a derivation operation of one immersive or visual track may be used as an input to another derived immersive or visual track. In some examples, this may only occur when each derived immersive or visual track in the hierarchy is also needed on its own.

Figure 8A:
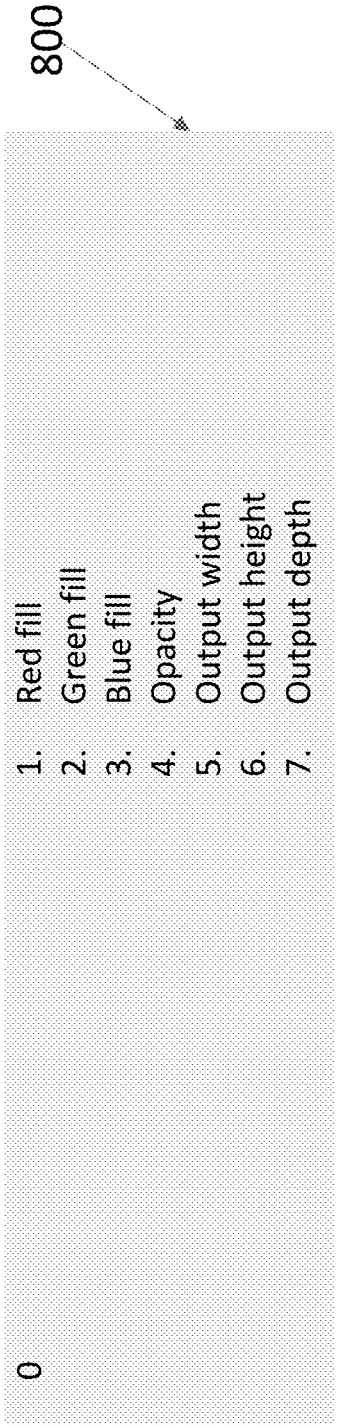
FIG. 8A shows an exemplary table describing derivation transformations for derived immersive tracks, according to some embodiments.
Figure 9:
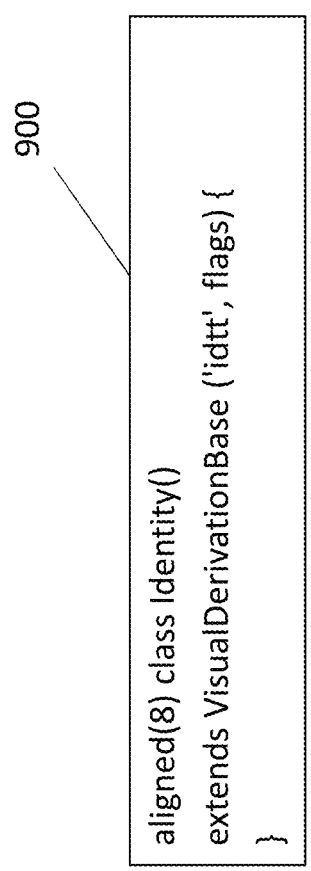
FIG. 9 shows an exemplary syntax that can be used to reproduce an immersive visual input, according to some embodiments.

FIGS. 8A and 8B show exemplary tables 800 describing derivation transformations for derived immersive tracks, according to some examples. Referring to FIGS. 8A-8B, a derivation transformation may include an identity transformation 801. The identity transformation may take in one input, such as an immersive visual input. The identity transformation may reproduce the immersive visual input. FIG. 9 describes syntax used for specifying an identity transformation, as discussed further below.

A derivation transformation may include a filling operation, such as sRGB Fill operation 810. The filling operation can be used to generate an immersive visual output of a single colour. The filling operation may require no input, and may have parameters including red fill, blue fill, green fill, opacity, output width, output height and output depth. The red fill, green fill and blue fill parameters may be used to indicate a pixel value for the red, green and blue channels respectively, and together may specify a color for the immersive visual output. The size of the immersive visual output may be specified by the width, height, and depth parameters, and the opacity parameter may indicate an opacity of the output. FIG. 10 describes syntax used for specifying a filling transformation, as discussed further below.

Figure 11:
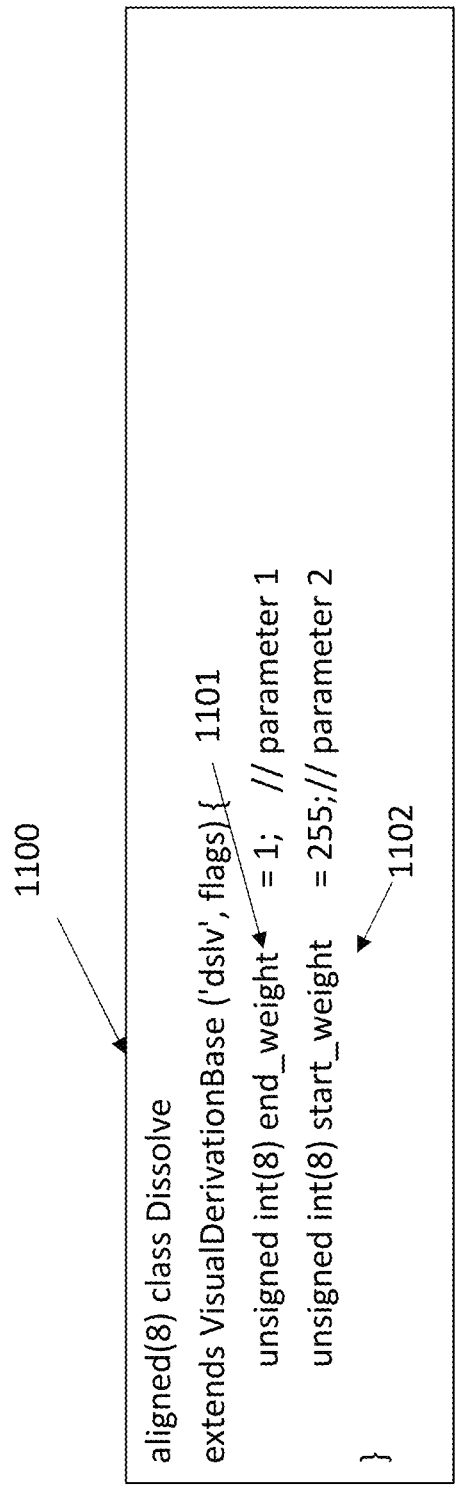
FIG. 11 shows an exemplary syntax that can be used to provide smooth blending of two immersive visual inputs, according to some embodiments.

A derivation transformation may include a dissolving operation 820. For example, can be used to provide smooth blending of two immersive visual inputs, according to some embodiments. For example, two immersive visual inputs may be input and the transformation may provide smooth blending by fading from a first immersive visual input to a second immersive visual input. The transformation may have two parameters specifying a proportion or weight for blending the inputs. FIG. 11 describes syntax used for specifying a blending transformation, as discussed further below.

A derivation transformation may include a cropping operation 830. The cropping operation 830 may take in an immersive visual input and crop the input based on values specified by parameters including width numerator, width denominator, height numerator, height denominator, depth numerator, depth denominator, X offset numerator, X offset denominator, Y offset numerator, Y offset denominator, Z offset numerator, and Z offset denominator. FIG. 12 describes syntax used for specifying a cropping transformation, as discussed further below.

A derivation transformation may include a rotating operation 840. The rotating operation 840 may take in an immersive visual input and rotate the input around an x, y, and/or z axis. For example, the immersive visual input may be rotated by a value specified by the X-Y angle, the Y-Z angle and the X-Z angle. For example, FIG. 13 is an example of syntax used for specifying a rotating operation, as discussed further below.

Figure 14:
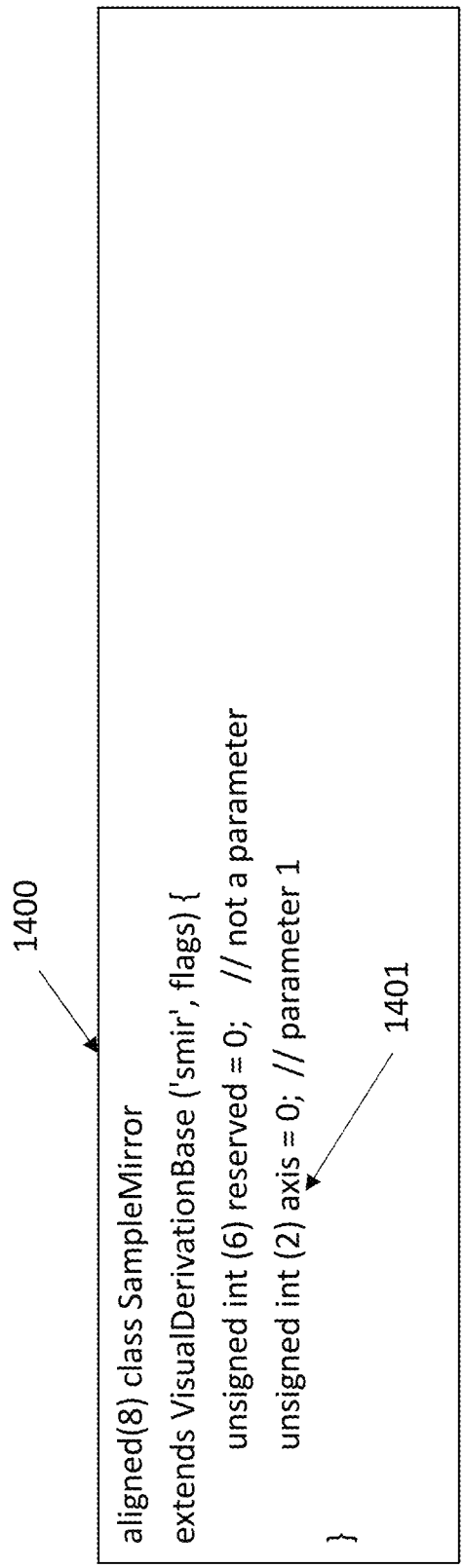
FIG. 14 shows an exemplary syntax that can be used to mirror the immersive visual input about an axis, according to some embodiments.

A derivation transformation may include a mirroring operation 850. The mirroring operation 850 may take in an immersive visual input and mirror the input vertically, horizontally or using stacked mirroring. The type of mirroring may be specified by the parameter axis. FIG. 14 is an example of syntax used for specifying a mirroring operation, as discussed further below.

A derivation transformation may include a scaling operation 860. The scaling operation 860 may take in an immersive visual input and scale the input by a factor specified by parameters to produce an immersive visual output. The parameters may include target width numerator, target width denominator, target height numerator, target height denominator, target depth numerator, and target depth denominator. Each of the numerators may be divided by the corresponding denominator to specify a scaling factor for the visual input. For example, FIG. 15 is an example of syntax used for specifying a scaling operation, as discussed further below.

Figure 16:
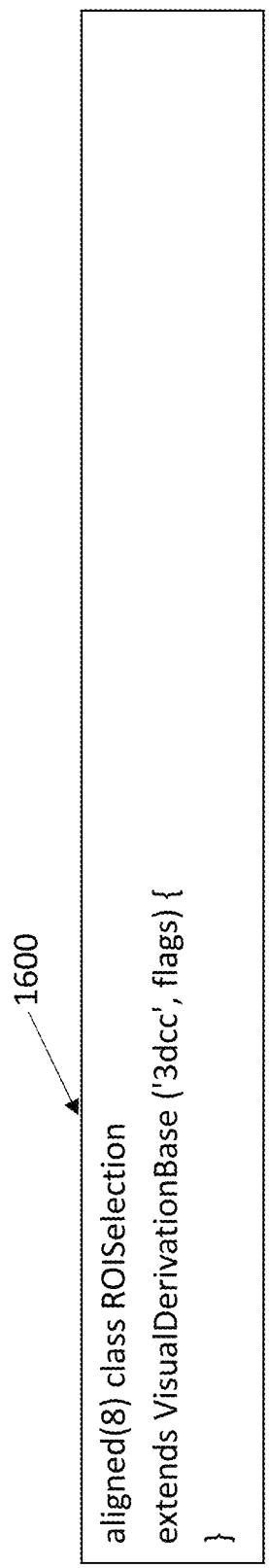
FIG. 16 shows an exemplary syntax that can use the 3D Cartesian coordinates carried in the second input track to crop the samples of the first input track, according to some embodiments.

A derivation transformation may include a selecting operation 870 for selecting a region of interest of an immersive visual input. In some embodiments, this derivation transformation may have two inputs, and the inputs may include a visual track and a ROI timed metadata track carrying 3D Cartesian coordinates. The 3D Cartesian coordinates carried in the second input track may be used to crop the samples of the first input track such that the visual output of the derivation transformation may contain only the rectangle specified by the 3D Cartesian coordinates of the ROI timed metadata track. FIG. 16 is an example of syntax used for specifying an operation for selecting a region of interest, as discussed further below.

A derivation transformation may include a grid composition operation 880. For example, a grid composition operation may provide an output composition of immersive visual inputs in a given 3D grid order. The number of inputs to the derivation transformation may be a value exactly equal to a number of rows multiplied by a number of columns multiplied by a number of layers of the immersive visual input.

The output composition may be of a width, height, and depth specified by the parameters output width, output height and output depth. FIG. 17 is an example of syntax used for specifying a grid composition operation, as discussed further below.

Figure 18:
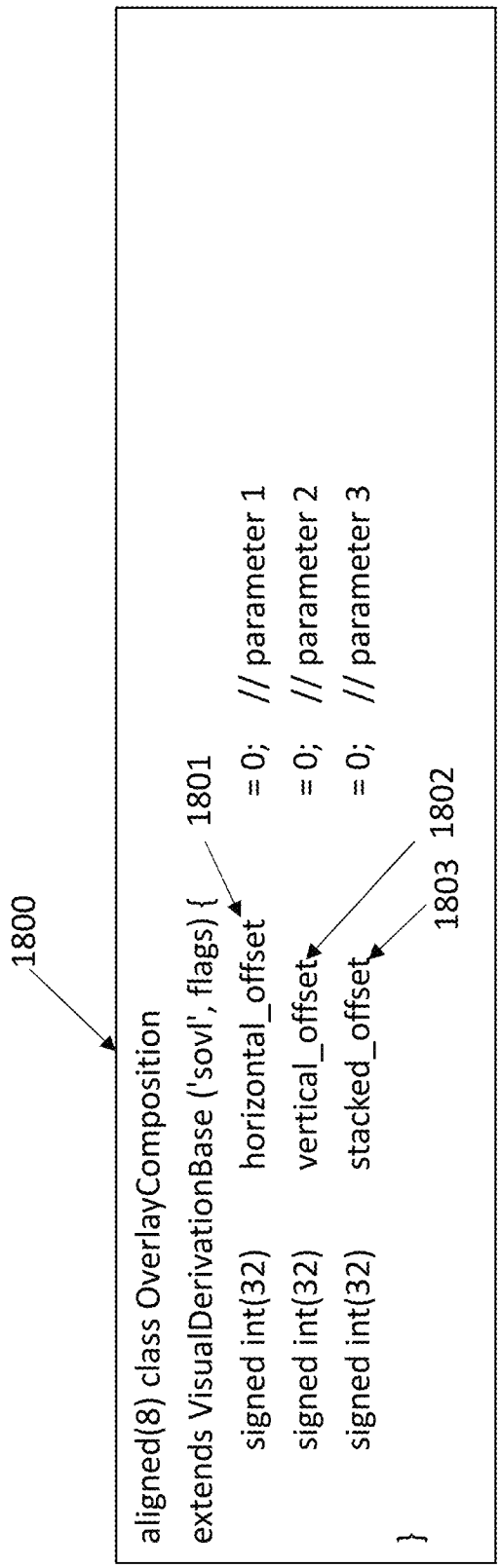
FIG. 18 shows an exemplary syntax that provides a composition of an immersive visual input over another visual input representing the backdrop, according to some embodiments.

A derivation transformation may include an overlaying operation 890 for overlaying a first input over a second input. The transformation may take in two visual inputs including a first input and a backdrop input. The overlay immersive visual input may be copied over the backdrop visual input using offsets of values specified by parameters such as horizontal, vertical and depth offsets. For example, FIG. 18 is an example of syntax used for specifying an overlaying composition operation, as discussed further below.

Various syntaxes and structures can be used to provide and/or represent a derivation transformation. While some examples are provided below, it should be appreciated that this is for exemplary purposes and is not intended to be limiting, as other conventions, syntaxes, names, etc. can be used to carry out the techniques described herein.

As described herein, the derivation transformation may be an identity transformation. For example, FIG. 9 shows exemplary syntax 900 that can be used to reproduce the immersive visual input. According to some examples, when a derivation operation with the identity derivation transformation is present in a derived sample, no other derivation operations should be present in the same derived sample.

As described herein, the derivation transformation may be a fill transformation. For example, FIG. 10 shows exemplary syntax 1000 that can be used to generate an immersive visual output of a single colour, according to some embodiments. The SRGBFill derivation transformation with visual size output_width, output_height and output_depth pixels. The red_fill_value field 1001 may indicate a pixel value for the red channel. In some embodiments, the pixel value for the red value may be a value according to the sRGB colour space specified in IEC 61966-2-1. The green_fill_value field 1002 may indicate a pixel value for the green channel. In some embodiments, the pixel value for the green channel may be a value according to the sRGB colour space specified in IEC 61966-2-1. The blue_fill_value field 1003 may indicate a pixel value for the blue channel. In some embodiments, the pixel value for the blue channel may be a value according to the sRGB colour space specified in IEC 61966-2-1.

The opacity_value 1004 may indicate the opacity value. According to some embodiments, the opacity value field may range from 0 (e.g., indicating full transparency) to 65535 (e.g., indicating full opacity). The output_width field 1005, output_height field 1006, output_depth field 1007 may specify the width, height and depth, respectively, of the immersive visual output (e.g., in pixels).

As described herein, the derivation transformation may be a blending operation. FIG. 11 shows exemplary syntax 1100 that can be used to provide smooth blending of two immersive visual inputs, according to some embodiments. For example, the syntax may provide smooth blending by gradually fading from a first immersive visual input to a second immersive visual input. In some embodiments, the visual output co-located pixel value, O(x,y,z) is computed by the weighted summation of the two immersive visual inputs where the weights are time-based transitions of the proportions provided by the value of the start_weight field and end_weight field. In the following equations, the value of T transitions linearly from 0 associated with at the time the derived sample starts to at the time the derived sample ends.

In some examples, the sizes of the visual inputs may be normalized to the size of the larger of the two visual inputs before the blending operation.

$$O(x,y,z)=A(x,y,z)*(T*(\text{end\_weight}-\text{start\_weight})+\text{start\_weight})/256+B(x,y,z)*((1-T)*(\text{end\_weight}-\text{start\_weight})+\text{start\_weight})/256 \qquad \text{Eq. 1:}$$

In Eq. 1, the symbol '/' is intended to represent a division by truncation. In some examples, O(x,y,z) is saturated to the dynamic range of the pixel values. The end_weight field 1101 and start_weight field 1102 may each be a value, for example, between 1 and 255, that represents the initial and final weights to be multiplied to collocated input pixels. According to some embodiments, a default value for end_weight may be 1, and a default value for start_weight may be 255. In some embodiments, the value 0 is reserved.

In some examples, an identity derivation transformation can be used in a preceding or following derived sample, if a copy of either immersive visual input is needed.

FIG. 12 shows exemplary syntax 1200 that can be used to specify a cropping transformation of the immersive visual input. The value of the cleanApertureWidthN field 1201 divided by the value of the cleanApertureWidthD field 1202 may be a fractional number which specifies the exact width (e.g., in counted pixels) of the visual input. The value of the cleanApertureHeightN field 1203 divided by the cleanApertureHeightD field 1204 may be a fractional number which specifies the exact height (e.g., in counted pixels) of the visual input. The value of the cleanApertureDepthN field 1205 divided by the value of the cleanApertureDepthD field 1206 may be a fractional number which specifies the exact depth (e.g., in counted pixels) of the visual input. According to some embodiments, the values of one or more of cleanApertureWidthD field 1202, cleanApertureHeightD field 1204, and/or cleanApertureDepthD field 1206 may be set or default to the value of one. In some examples, the value of the cleanApertureWidthN field 1201, cleanApertureHeightN field 1203, and/or cleanApertureDepthN field 1205 may specify the exact width, height, and/or depth of the visual input (e.g., in counted pixels) respectively.

According to some embodiments, the values of one or more of cleanApertureWidthD field 1202, cleanApertureHeightD field 1204, and/or cleanApertureDepthD field 1206 may be set or default to the value of one. In some examples, the value of the cleanApertureWidthN field 1201, cleanApertureHeightN field 1203, and/or cleanApertureDepthN field 1205 may specify the exact width, height, and/or depth of the visual input (e.g., in counted pixels) respectively. According to some embodiments, fields 1201-1206 may all be positive or required to be positive.

The value of the horizOffN field 1207 divided by the horizOffD field 1208 may be a fractional number which specifies the horizontal offset of clean aperture center minus the width subtracted by one, and divided by two (e.g., in counted pixels). The value of the vertOffN field 1209 divided by the value of the vertOffD field 1210 may be a fractional number specifies the vertical offset of clean aperture center minus the width subtracted by one, and divided by two (e.g., in counted pixels). The value of the depOffN field 1211 divided by the value of the depOffD field 1212 may be a fractional number which specifies the depth offset of clean aperture center minus the width subtracted by one, and divided by two (e.g., in counted pixels). The fractional values created by these values may typically be 0. According to some examples, the semantics of the syntax elements within the syntax 1200 are the same as those specified for the syntax elements of CleanApertureBox as specified in ISO/

IEC 14496-12. For example, the fractions created by each pair of fields may be specified in reduced terms. According to some examples, the value of horizOffN and vertOffN may be positive or negative. In some examples, the values of horizOffD, vertOffD, depOffD must be specified as a positive value.

According to some embodiments, a derivation transformation may include a rotation of immersive visual input. FIG. 13 shows exemplary syntax 1300 that can be used to rotate the immersive visual input. For example, the syntax may be used to rotate the immersive visual input in anti-clockwise directions in units of 90 degrees, such as in the XY, XZ and YZ planes. The value of the angleXY field 1301 multiplied by 90, the value of the angleXZ field 1302 multiplied by 90 and the value of the angleYZ field 1303 multiplied by 90 may specify the value of angles (e.g., in anti-clockwise direction) (e.g., in units of degrees), in the XY, XZ and YZ planes to rotate by, respectively.

According to some embodiments, a derivation transformation may include a mirroring of immersive visual input. FIG. 14 shows exemplary syntax 1400 that can be used to mirror the immersive visual input about a vertical (e.g., about a Y axis), horizontal (e.g., about an X axis) or stacked (e.g., about a Z axis) axis. The value of the axis field 1401 may specify an axis for the mirroring transformation. For example, a value of 0 for the field 1401 may indicate a vertical axis, a value of 1 for the field 1401 may indicate a horizontal axis, and a value of 2 for the field 1401 may indicate a stacked axis for the mirroring transformation. In some embodiments, the vertical mirror is a left-right mirror, horizontal mirror is a top-down mirror, and/or a stacked mirror is a front-back mirror.

According to some embodiments, a derivation transformation may include a scaling of immersive visual input to a target size. FIG. 15 shows exemplary syntax 1500 that can be used to scale an input to a specified size.

The target_width_numerator 1501 can specify the numerator of the scaling ratio for the resized image in the horizontal dimension (e.g., and can be restricted so that the value 0 is not used). The target_width_denominator 1502 can specify the denominator of the scaling ratio for the resized image in the horizontal dimension (e.g., and can be restricted so that the value 0 is not used). The target_height_numerator 1503 can specify the numerator of the scaling ratio for the resized image in the vertical dimension (e.g., and can be restricted so that the value 0 is not used). The target_height_denominator 1504 can specify the denominator of the scaling ratio for the resized image in the vertical dimension (e.g., and can be restricted so that the value 0 is not used). The target_depth_numerator 1505 can specify the numerator of the scaling ratio for the resized image in the depth dimension (e.g., and can be restricted so that the value 0 is not used). The target_depth_denominator 1506 can specify the denominator of the scaling ratio for the resized image in the depth dimension (e.g., and can be restricted so that the value 0 is not used). In some examples, the fields 1501-1506 may be a default value of 1.

According to some embodiments, the semantics of the syntax elements within the derivation transformation are the same as those specified for the syntax elements of ImageScaling as specified in ISO/IEC 23008-12. For example, the computation of the target size from the syntax elements may be the same as the one specified for ImageScaling as specified in ISO/IEC 23008-12.

According to some embodiments, a derivation transformation may include a selection of a region of interest (ROI) of immersive visual input. In some embodiments, this derivation transformation may have two inputs, and the inputs for this derivation transformation may be a visual track and a ROI timed metadata track carrying 3D Cartesian coordinates (e.g., as specified in ISO/IEC 23001-10).

FIG. 16 shows exemplary syntax 1600 that can use the 3D Cartesian coordinates carried in the second input track to crop the samples of the first input track. In other words, the ROI timed metadata track carrying 3D Cartesian coordinates is applied prescriptively to the visual track that is the input for the ROI selection derivation transformation. The visual output of the derivation transformation may contain only the rectangle specified by the 3D Cartesian coordinates of the ROI timed metadata track.

According to some embodiments, a derivation transformation may provide a grid composition of immersive visual inputs.

For example, FIG. 17 is an example of syntax 1700 that provides a composition of immersive visual inputs in a given 3D grid order. The number of inputs to the derivation transformation may be a value exactly equal to a number of rows multiplied by a number of columns multiplied by the number of layers of the immersive visual input. According to some examples, the first visual input is the top-left cell of the grid, and/or the last visual input is the bottom-right cell of the grid.

According to some embodiments, the visual inputs may be provided in row-major order, top-row first, left to right, in the order they are listed as the derivation operation inputs. The number of visual inputs may be equal to the number of rows multiplied by the number of columns multiplied by the number of layers. In some examples, each immersive visual inputs may have exactly the same width, height and depth. In some cases, this may require resizing. The immersive visual inputs, when composed together, completely "cover" the immersive visual output of the transformation according to the 3D grid, where the width multiplied by the number of columns is equal to the value of the output_width, where the height multiplied by the number of rows is equal to the value of output_height, and the depth multiplied by the number of layers is equal to the value of output_depth. For example, the visual output of the transformation may be formed by tiling the visual inputs into a 3D grid with a column width equal to width and a row height equal to height, and a layer depth equal to depth, without any gap or overlap.

The output_width field 1704, output_height field 1705, and the output_depth field 1706 may specify the width, height and depth, respectively, of the reconstructed immersive visual output on which the immersive visual inputs are placed.

The rows_minus_one field 1701, columns_minus_one field 1702, and the layers_minus_one field 1603 specify the number of rows, columns and layers in the 3D grid. According to some embodiments, the value of the fields 1701, 1702, and 1703 may be one less than the number of rows, columns or layers, respectively. As such, the number of visual inputs as described herein may also be calculated by multiplying the sum of the value of the rows_minus_one field 1701 and one by the sum of the value of the columns_minus_one field 1702 and one and subsequently multiplying this value by the sum of the value of the layers_minus_one field 1703 (e.g., (rows_minus_one+1)×(columns_minus_one+1)× (layers_minus_one+1)) According to some embodiments, visual inputs populate the top row first, followed by the second and following, in the listing order of the derivation operation inputs.

According to some embodiments, a derivation transformation may provide an overlay composition of immersive visual inputs. For example, FIG. 18 is an example of syntax 1800 that provides a composition of an immersive visual input over another visual input representing the backdrop. For example, the immersive visual output may be a composition of an overlay immersive visual input over a backdrop visual input.

According to some embodiments, the overlay immersive visual input may be copied over the backdrop visual input using offsets specified by the syntax 1800. For example, the overlay immersive visual input may be copied over the backdrop visual input using offsets of values of the horizontal_offset field 1801, vertical_offset field 1802 stacked_offset field 1803. According to some embodiments, the horizontal_offset field 1801, vertical_offset field 1802, and stacked_offset field 1803 specify the offset, from the top-left-front corner of the backdrop visual input, to which the overlay immersive visual input is located. In some examples, pixel locations with a negative offset value are not included in the reconstructed immersive visual output.

In some examples, the size of the reconstructed visual output may be equal to the size of the backdrop visual input. For example, pixels of the overlay visual input that may end up outside the backdrop visual input size by the copy operation can be cropped. For example, horizontal pixel locations greater than or equal to the width of the backdrop visual input may not be included in the reconstructed immersive visual output. In some examples, vertical pixel locations greater than or equal to the height of the backdrop visual input may not be included in the reconstructed immersive visual output. Stacked pixel locations greater than or equal to the depth of the backdrop visual input are not included in the reconstructed immersive visual output. In some examples, when a visual input has an associated alpha plane, alpha blending shall be performed on the visual input.

According to some embodiments, a chain of derivation operations can be used to create a sequence of multiple overlay composition derivation transformations. This may allow overlaying of multiple visual inputs over an initial backdrop visual input in an ordered sequence. For example, a backdrop visual input of a first overlay composition derivation transformation in a sequence of overlay compositions may represent the initial backdrop visual input. In subsequent overlay composition derivation transformation in the sequence, the backdrop visual input should designate the visual output of the preceding overlay composition derivation transformation in the sequence (e.g., the input backdrop visual input of the nth overlay composition derivation transformation should be the output of the n−1th overlay composition derivation transformation). Therefore, the first overlay composition derivation transformation in the sequence represents the overlay composition of the bottom-most overlay visual input over the initial backdrop visual input. The last overlay composition derivation transformation in the sequence represents the overlay composition of the top-most overlay visual input over the reconstructed visual output of preceding overlay derivation transformations in the sequence. In some embodiments, a visual output of a sRGB fill derivation transformation may be used as an initial backdrop visual input.

Figure 19:
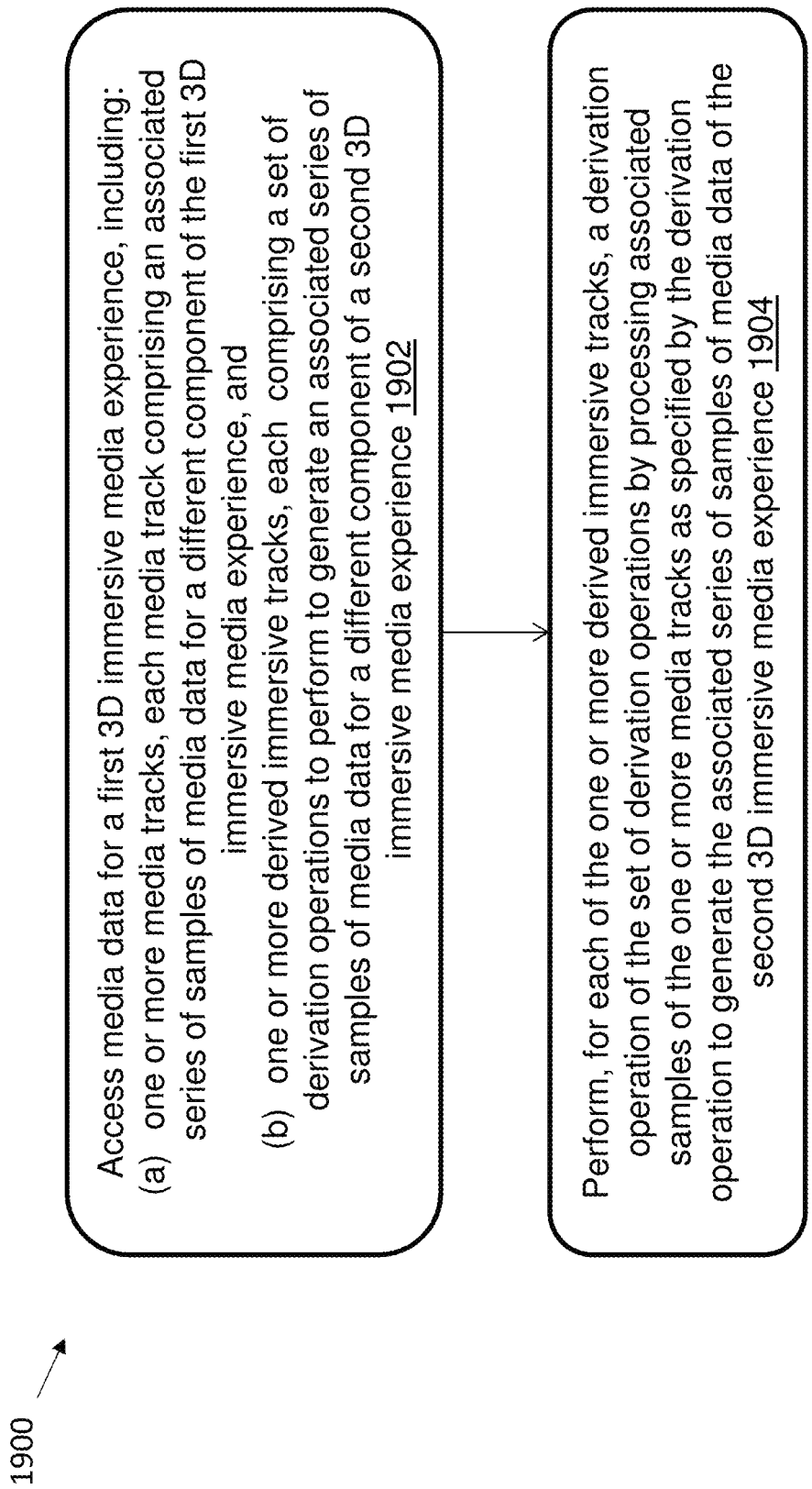
FIG. 19 shows an exemplary computerized method for obtaining video data for immersive media, according to some embodiments.

FIG. 19 shows an exemplary computerized method 1900 for obtaining video data for immersive media, according to some embodiments.

At step 1902, the method includes accessing media data for a first 3D immersive media experience. The media data may include one or more media tracks, where each media track comprises an associated series of samples of media data for a different component of the first 3D immersive media experience. The media data may also include one or more derived immersive tracks, each comprising a set of derivation operations to perform to generate an associated series of samples of media data for a different component of a second 3D immersive media experience.

At step 1904, the method includes performing, for each of the one or more derived immersive tracks, a derivation operation of the set of derivation operations by processing associated samples of the one or more media tracks as specified by the derivation operation to generate the associated series of samples of media data of the second 3D immersive media experience.

For example, the derivation operation may an identity operation for reproducing associated samples of the one or more media tracks, a filling operation for generating the series of samples of media data of the second 3D immersive media experience by filling a single color of a size specified by a pixel width, pixel height and pixel depth, an operation for blending samples such that one or more first samples of a first media track of the one or more media tracks fades to one or more second samples of a second media track of the one or more media tracks, an operation for cropping the associated samples of the one or more media tracks, an operation for rotating the associated samples of the one or more media tracks, an operation for mirroring the associated samples of the one or more media tracks, and/or an operation for scaling the associated samples of the one or more media tracks to a specified size.

In some examples, the one or more media tracks may include a first input track comprising a first series of samples of media data and a second input track comprising metadata specifying 3D coordinate data and the derivation operation may be an operation for selecting a region of interest. For example, the derivation operation may be an operation for processing one or more samples of the first series of samples of the first input track based on the specified 3D coordinate data.

In some examples, the one or more media tracks may include a plurality of media tracks and the derivation operation may include an operation for generating a composition of media samples of each of the plurality of media tracks.

In some examples, the one or more media tracks includes a plurality of media tracks and the derivation operation may be an operation for overlaying one or more first samples of a first media track of the plurality of media tracks over a one or more second samples of a second media track of the plurality of media tracks.

In some examples, generating the series of samples of the 3D immersive media experience comprises generating a first output track comprising a first series of one or more first derived samples of the second 3D immersive media experience and generating a second output track comprising a second series of one or more second derived samples of the second 3D immersive media experience.

In some embodiments, the number of the one or more derived immersive tracks is equal to the number of the one or more one or more media tracks. Generating the series of samples of the second 3D immersive media experience may include performing, for each of the one or more derived immersive tracks, a derivation operation of the set of derivation operations further includes generating an output track comprising the generated associated series of samples of media data of the second 3D immersive media experience.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for obtaining video data for immersive media, the method comprising:
 receiving, as input, media data for a first three-dimensional (3D) immersive media experience, comprising:
  one or more media tracks, each media track comprising an associated series of samples of media data for a different component of the first 3D immersive media experience; and
  one or more derived immersive tracks, each comprising a set of derivation operations to perform to generate an associated series of samples of media data for a different component of a second 3D immersive media experience; and
 performing, for each of the one or more derived immersive tracks, a derivation operation of the set of derivation operations by processing associated samples of the one or more media tracks as specified by the derivation operation to generate, as output, the associated series of samples of media data of the second 3D immersive media experience.

2. The method of claim 1, wherein the derivation operation is an identity operation for reproducing associated samples of the one or more media tracks.

3. The method of claim 1, wherein the derivation operation comprises a filling operation for generating the series of samples of the second 3D immersive media experience by filling a single color of a size specified by a pixel width, pixel height and pixel depth.

4. The method of claim 1, wherein the derivation operation comprises an operation for blending samples such that one or more first samples of a first media track of the one or more media tracks fades to one or more second samples of a second media track of the one or more media tracks.

5. The method of claim 1, wherein the derivation operation comprises an operation for cropping the associated samples of the one or more media tracks.

6. The method of claim 1, wherein the derivation operation comprises an operation for rotating the associated samples of the one or more media tracks.

7. The method of claim 1, wherein the derivation operation comprises an operation for mirroring the associated samples of the one or more media tracks.

8. The method of claim 1, wherein the derivation operation comprises an operation for scaling the associated samples of the one or more media tracks to a specified size.

9. The method of claim 1, wherein:
the one or more media tracks comprises:
a first input track comprising a first series of samples of media data; and
a second input track comprising metadata specifying 3D coordinate data; and
the derivation operation comprises an operation for processing one or more samples of the first series of samples of the first input track based on the specified 3D coordinate data.

10. The method of claim 1, wherein generating the associated series of samples of media data of the second 3D immersive media experience comprises:
generating a first output track comprising a first series of one or more first derived samples of the second 3D immersive media experience; and
generating a second output track comprising a second series of one or more second derived samples of the second 3D immersive media experience.

11. The method of claim 1, wherein a first number of the one or more derived immersive tracks is equal to a second number of the one or more one or more media tracks, and wherein generating the associated series of samples of media data of the second 3D immersive media experience comprises:
generating an output track comprising the generated associated series of samples of media data of the second 3D immersive media experience.

12. The method of claim 1, wherein:
the one or more media tracks comprises a plurality of media tracks; and
the derivation operation comprises an operation for generating a composition of media samples of each of the plurality of media tracks.

13. The method of claim 1, wherein:
the one or more media tracks comprises a plurality of media tracks; and
the derivation operation comprises an operation for overlaying one or more first samples of a first media track of the plurality of media tracks over a one or more second samples of a second media track of the plurality of media tracks.

14. An apparatus configured to decode video data, the apparatus comprising a processor in communication with memory, the processor being configured to execute instructions stored in the memory that cause the processor to perform:
receiving, as input, media data for a first three-dimensional (3D) immersive media experience, comprising:
one or more media tracks, each media track comprising an associated series of samples of media data for a different component of the first 3D immersive media experience; and
one or more derived immersive tracks, each comprising a set of derivation operations to perform to generate an associated series of samples of media data for a different component of a second 3D immersive media experience; and
performing, for each of the one or more derived immersive tracks, a derivation operation of the set of derivation operations by processing associated samples of the one or more media tracks as specified by the derivation operation to generate, as output, the associated series of samples of media data of the second 3D immersive media experience.

15. The apparatus of claim 14, wherein generating the series of samples of the second 3D immersive media experience comprises:
generating a first output track comprising a first series of one or more first derived samples of the second 3D immersive media experience; and
generating a second output track comprising a second series of one or more second derived samples of the second 3D immersive media experience.

16. The apparatus of claim 14, wherein a first number of the one or more derived immersive tracks is equal to a second number of the one or more one or more media tracks, and wherein generating the series of samples of the second 3D immersive media experience comprises:
performing, for each of the one or more derived immersive tracks, a derivation operation of the set of derivation operations; and
generating an output track comprising the generated associated series of samples of media data of the second 3D immersive media experience.

17. At least one non-transitory computer-readable storage medium storing processor executable instructions that, when executed by at least one processor, cause the processor to perform a method comprising:
receiving, as input, media data for a first three-dimensional (3D) immersive media experience, comprising:
one or more media tracks, each media track comprising an associated series of samples of media data for a different component of the first 3D immersive media experience; and
one or more derived immersive tracks, each comprising a set of derivation operations to perform to generate an associated series of samples of media data for a different component of a second 3D immersive media experience; and
performing, for each of the one or more derived immersive tracks, a derivation operation of the set of derivation operations by processing associated samples of the one or more media tracks as specified by the derivation operation to generate, as output, the associated series of samples of media data of the second 3D immersive media experience.

18. The at least one non-transitory computer-readable storage medium of claim 17, wherein generating the series of samples of the second 3D immersive media experience comprises:
generating a first output track comprising a first series of one or more first derived samples of the second 3D immersive media experience; and
generating a second output track comprising a second series of one or more second derived samples of the second 3D immersive media experience.

19. The at least one non-transitory computer-readable storage medium of claim 17, wherein a first number of the one or more derived immersive tracks is equal to a second number of the one or more one or more media tracks, and wherein generating the series of samples of the second 3D immersive media experience comprises:
performing, for each of the one or more derived immersive tracks, a derivation operation of the set of derivation operations; and
generating an output track comprising the generated associated series of samples of media data of the second 3D immersive media experience.

20. The at least one non-transitory computer-readable storage medium of claim 17, wherein the derivation operation is an identity operation for reproducing associated samples of the one or more media tracks.

* * * * *